United States Patent
Marwah et al.

(10) Patent No.: US 10,165,473 B2
(45) Date of Patent: Dec. 25, 2018

(54) COLLISION AVOIDANCE IN MULTI-SUBSCRIBER IDENTITY MODULE (SIM) WIRELESS COMMUNICATION DEVICES

(71) Applicant: QUALCOMM Incorporated, San Diego, CA (US)

(72) Inventors: Vijay Marwah, San Diego, CA (US); Kuo-Chun Lee, San Diego, CA (US); Srinivasan Rajagopalan, San Diego, CA (US); Ramchandran Srinivasan, San Diego, CA (US); Anand Chowdhary Kolluri, San Diego, CA (US); Anindya Majumder, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 173 days.

(21) Appl. No.: 15/172,019

(22) Filed: Jun. 2, 2016

(65) Prior Publication Data
US 2017/0353893 A1 Dec. 7, 2017

(51) Int. Cl.
| | |
|---|---|
| *H04W 4/00* | (2018.01) |
| *H04W 36/00* | (2009.01) |
| *H04W 8/06* | (2009.01) |
| *H04W 36/14* | (2009.01) |
| *H04W 88/02* | (2009.01) |
| *H04W 88/08* | (2009.01) |
| *H04W 36/16* | (2009.01) |

(52) U.S. Cl.
CPC ......... *H04W 36/0022* (2013.01); *H04W 8/06* (2013.01); *H04W 36/0055* (2013.01); *H04W 36/14* (2013.01); *H04W 36/165* (2013.01); *H04W 88/02* (2013.01); *H04W 88/08* (2013.01)

(58) Field of Classification Search
CPC .......... H04W 36/0022; H04W 36/165; H04W 48/06; H04W 48/18; H04W 48/20; H04W 60/005; H04W 68/12; H04W 76/38; H04W 8/06; H04W 36/14; H04W 36/0055
USPC ......... 370/252, 329, 331; 455/436, 437, 448
See application file for complete search history.

(56) References Cited

U.S. PATENT DOCUMENTS

| | | |
|---|---|---|
| 2013/0090137 A1 | 4/2013 | Krishnamoorthy et al. |
| 2013/0244660 A1* | 9/2013 | Kumar ................ H04W 36/165 455/436 |
| 2014/0073366 A1 | 3/2014 | Xing et al. |

(Continued)

FOREIGN PATENT DOCUMENTS

EP 2466970 A1 6/2012

OTHER PUBLICATIONS

International Search Report and Written Opinion—PCT/US2017/032877—ISA/EPO—dated Jul. 26, 2017.

*Primary Examiner* — Harun Chowdhury
(74) *Attorney, Agent, or Firm* — Paradice and Li LLP/Qualcomm

(57) ABSTRACT

Examples described herein relate to managing communications for a first subscription and a second subscription of a wireless communication device, including, but not limited to, determining collision between activities of the first subscription over a first RAT and activities of the second subscription over a second RAT and reselecting from the second RAT to a third RAT for the second subscription.

18 Claims, 11 Drawing Sheets

(56) References Cited

U.S. PATENT DOCUMENTS

| | | | |
|---|---|---|---|
| 2014/0106750 A1* | 4/2014 | Roullier | H04W 48/20 |
| | | | 455/436 |
| 2015/0141017 A1 | 5/2015 | Krishnamoorthy et al. | |
| 2015/0257057 A1* | 9/2015 | Su | H04W 36/0022 |
| | | | 370/329 |
| 2016/0134316 A1 | 5/2016 | Mohan et al. | |
| 2016/0249408 A1* | 8/2016 | Thiruvenkatachari | |
| | | | H04W 76/38 |
| 2017/0318523 A1* | 11/2017 | Lindoff | H04W 48/20 |

* cited by examiner

US 10,165,473 B2

COLLISION AVOIDANCE IN MULTI-SUBSCRIBER IDENTITY MODULE (SIM) WIRELESS COMMUNICATION DEVICES

BACKGROUND

A wireless communication device, such as a mobile phone device or a smart phone, may include two or more Subscriber Identity Modules (SIMs). Each SIM may correspond to at least one subscription via a Radio Access Technology (RAT). Such a wireless communication device may be a multi-SIM wireless communication device. In a Multi-SIM-Multi-Active (MSMA) wireless communication device, all SIMs may be active at the same time. In a Multi-SIM-Multi-Standby (MSMS) wireless communication device, if any one SIM is active, then the rest of the SIM(s) may be in a standby mode. The RATs may include, but are not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network.

Some communication activities of various RATs can be cyclical, repeated at least once in a given repetition period or cycle. For instance, eMBMS data can be broadcasted based on a data burst schedule, according to which eMBMS services in data bursts are scheduled to be broadcasted within each Mutlicast Channel (MCH) Scheduling Period (MSP). In addition, the wireless communication device wakes up once per Discontinuous Reception (DRX) cycle for receiving and decoding pages on WCDMA, LTE, GSM, TDS, 1×, and the like.

Activities of two subscriptions in a MSMS wireless communication device can overlap with one another in time, resulting in contention for the shared RF resource and causing reception or transmission failure on the subscription that is denied access to the RF resource. This problem can be especially pronounced when period or cycle lengths of two RATs (each associated with a different subscription) are the same, because collision in one period or cycle can persist through subsequent cycles. User experience can be drastically degraded given that persistent failures can lead to low data throughput, dropped calls, and wasted time and power.

SUMMARY

Examples described herein are related to managing communications on a first subscription and a second subscription of a multi-Subscriber Identity Module (SIM) wireless communication device. The wireless communication device may have a first SIM enabling the first subscription and a second SIM enabling the second subscription. The first subscription may employ at least a first Radio Access Technology (RAT). The second subscription may employ at least a second RAT and third RAT, such that the third RAT may be reselected from the second RAT, vice versa. The wireless communication device may be a Multi-SIM-Multi-Standby (MSMS) device and/or a device having a Radio Frequency (RF) resource being shared between the first subscription and second subscription.

In various examples, the wireless communication device may reselect from the second RAT to the third RAT with respect to the second subscription to avoid persistent collisions between the first subscription and the second subscription. Persistent collisions can occur when cyclic activities of the first RAT and second RAT collide (overlap in time) in a given repetition period or cycle, and that the repetition periods or cycles of both the first RAT and second RAT are the same or multiples of one another. The repetition periods or cycles of the first RAT and third RAT may be different and not multiples of one another, thus avoiding repeated collisions.

In various embodiments, a method for a wireless communication device having a first SIM associated with a first subscription and a second SIM associated with a second subscription to manage communications on the first subscription and the second subscription via a RF resource, the method including determining collision between activities of the first subscription over a first RAT and activities of the second subscription over a second RAT and reselecting from the second RAT to a third RAT for the second subscription.

In some embodiments, the method further includes determining whether the activities of the first subscription have ended.

In some embodiments, the method further includes reselecting from the third RAT to the second RAT for the second subscription in response to determining that the activities of the first subscription have ended.

In some embodiments, the method further includes communicating on the second subscription over the third RAT in response to determining that the activities of the second RAT have not ended.

In some embodiments, the method further includes initiating a timer in response to determining that the activities of the first subscription have ended, determining whether the timer has expired, determining whether the first subscription is active in response to determining that the timer has expired, and reselecting from the third RAT to the second RAT for the second subscription in response to determining that the first subscription is inactive.

In some embodiments, the method further includes communicating on the second subscription over the third RAT in response to determining that the first subscription is active.

In some embodiments, the method further includes monitoring neighbor cells associated with the second RAT after reselecting to the third RAT, determining whether the activities of the first RAT collide with activities of the second RAT with respect to a neighbor cell of the neighbor cells, and reselecting from the third RAT to the second RAT in response to determining that the activities of the first RAT do not collide with the activities of the second RAT with respect to the neighbor cell.

In some embodiments, the method further includes determining that the neighbor cell meets handover or reselection criteria, and determining whether the activities of the first RAT collide with the activities of the second RAT with respect to the neighbor cell in response to determining that the neighbor cell meets the handover or reselection criteria.

In some embodiments, the method further includes continuing to camp on the third RAT in response to determining that the activities of the first RAT collide with the activities of the second RAT with respect to the neighbor cell.

In some embodiments, the method further includes monitoring neighbor cells associated with the first RAT after reselecting to the third RAT, determining whether the activities of the first RAT with respect to a neighbor cell of the neighbor cells collide with the activities of the second RAT, and reselecting from the third RAT to the second RAT in response to determining that the activities of the first RAT with respect to the neighbor cell do not collide with the activities of the second RAT.

In some embodiments, the method further includes determining that the neighbor cell meets handover or reselection criteria, and determining whether the activities of the first RAT with respect to the neighbor cell collide with the activities of the second RAT in response to determining that the neighbor cell meets the handover or reselection criteria.

In some embodiments, the method further includes continuing to camp on the third RAT in response to determining that the activities of the first RAT with respect to the neighbor cell collide with the activities of the second RAT.

In some embodiments, a length of a second repetition period of the activities over the second RAT is multiples of a length of a first repetition period of the activities over the first RAT. A length of a third repetition period of the activities over the third RAT is indivisible by the first repetition period.

In some embodiments, the first repetition period is at least one of a Mutlicast Channel (MCH) Scheduling Period (MSP) or Discontinuous Reception (DRX) cycle, the second repetition period is a DRX cycle for the second RAT, and the third repetition period is a DRX cycle for the third RAT.

In some embodiments, the first RAT is at least one of Long Term Evolution (LTE) or evolved Multimedia Broadcast Multicast Services (eMBMS). In some embodiments, the second RAT is at least one of Wideband Code Division Multiple Access (WCDMA), Time Division Synchronous Code Division Multiple Access (TD-SCDMA), Code Division Multiple Access 1× Radio Transmission Technology (1×), or LTE. In some embodiments, the third RAT is Global System for Mobile Communications (GSM).

In some embodiments, the activities of the first subscription includes at least one of data bursts or pages. In some embodiments, the activities of the second subscription includes pages.

According to some embodiments, a wireless communication device includes a RF resource, a processor configured to connect to a first SIM associated with a first subscription and to a second SIM associated with a second subscription, and configured to determine collision between activities of the first subscription over a first RAT and activities of the second subscription over a second RAT, and reselect from the second RAT to a third RAT for the second subscription, and a memory.

In some embodiments, the processor is further configured to determine whether the activities of the first subscription have ended.

In some embodiments, the processor is further configured to reselect from the third RAT to the second RAT for the second subscription in response to determining that the activities of the first subscription have ended.

In some embodiments, the processor further configures the RF resource to communicate on the second subscription over the third RAT in response to determining that the activities of the second RAT have not ended.

In some embodiments, the processor is further configured to initiate a timer in response to determining that the activities of the first subscription have ended, determine whether the timer has expired, determine whether the first subscription is active in response to determining that the timer has expired, and reselect from the third RAT to the second RAT for the second subscription in response to determining that the first subscription is inactive.

In some embodiments, the processor further configures the RF resource to communicate on the second subscription over the third RAT in response to determining that the first subscription is active.

In some embodiments, the processor is further configured to monitor neighbor cells associated with the second RAT after reselecting to the third RAT, determine whether the activities of the first RAT collide with activities of the second RAT with respect to a neighbor cell of the neighbor cells, and reselect from the third RAT to the second RAT in response to determining that the activities of the first RAT do not collide with the activities of the second RAT with respect to the neighbor cell.

In some embodiments, the processor is further configured to determine that the neighbor cell meets handover or reselection criteria, and determine whether the activities of the first RAT collide with the activities of the second RAT with respect to the neighbor cell in response to determining that the neighbor cell meets the handover or reselection criteria.

In some embodiments, the processor is further configured to continue to camp on the third RAT in response to determining that the activities of the first RAT collide with the activities of the second RAT with respect to the neighbor cell.

In some embodiments, the processor is further configured to monitor neighbor cells associated with the first RAT after reselecting to the third RAT, determine whether the activities of the first RAT with respect to a neighbor cell of the neighbor cells collide with the activities of the second RAT, and reselect from the third RAT to the second RAT in response to determining that the activities of the first RAT with respect to the neighbor cell do not collide with the activities of the second RAT.

In some embodiments, the processor is further configured to determine that the neighbor cell meets handover or reselection criteria and determine whether the activities of the first RAT with respect to the neighbor cell collide with the activities of the second RAT in response to determining that the neighbor cell meets the handover or reselection criteria.

In some embodiments, the processor is further configured to continue to camp on the third RAT in response to determining that the activities of the first RAT with respect to the neighbor cell collide with the activities of the second RAT.

In some embodiments, a non-transitory computer-readable medium having processor-readable instructions such that, when executed, causes a processor to perform a method for managing communications on a first subscription and a second subscription via a RF resource, the method including determining collision between activities of the first subscription over a first RAT and activities of the second subscription over a second RAT, and reselecting from the second RAT to a third RAT for the second subscription.

According to some embodiments, a wireless communication device includes means for determining collision between activities of the first subscription over a first RAT and activities of the second subscription over a second RAT and means for reselecting from the second RAT to a third RAT for the second subscription.

BRIEF DESCRIPTION OF THE DRAWINGS

The accompanying drawings, which are incorporated herein and constitute part of this specification, illustrate exemplary examples of the disclosure, and together with the general description given above and the detailed description given below, serve to explain the features of the various examples.

DETAILED DESCRIPTION

Figure 1:
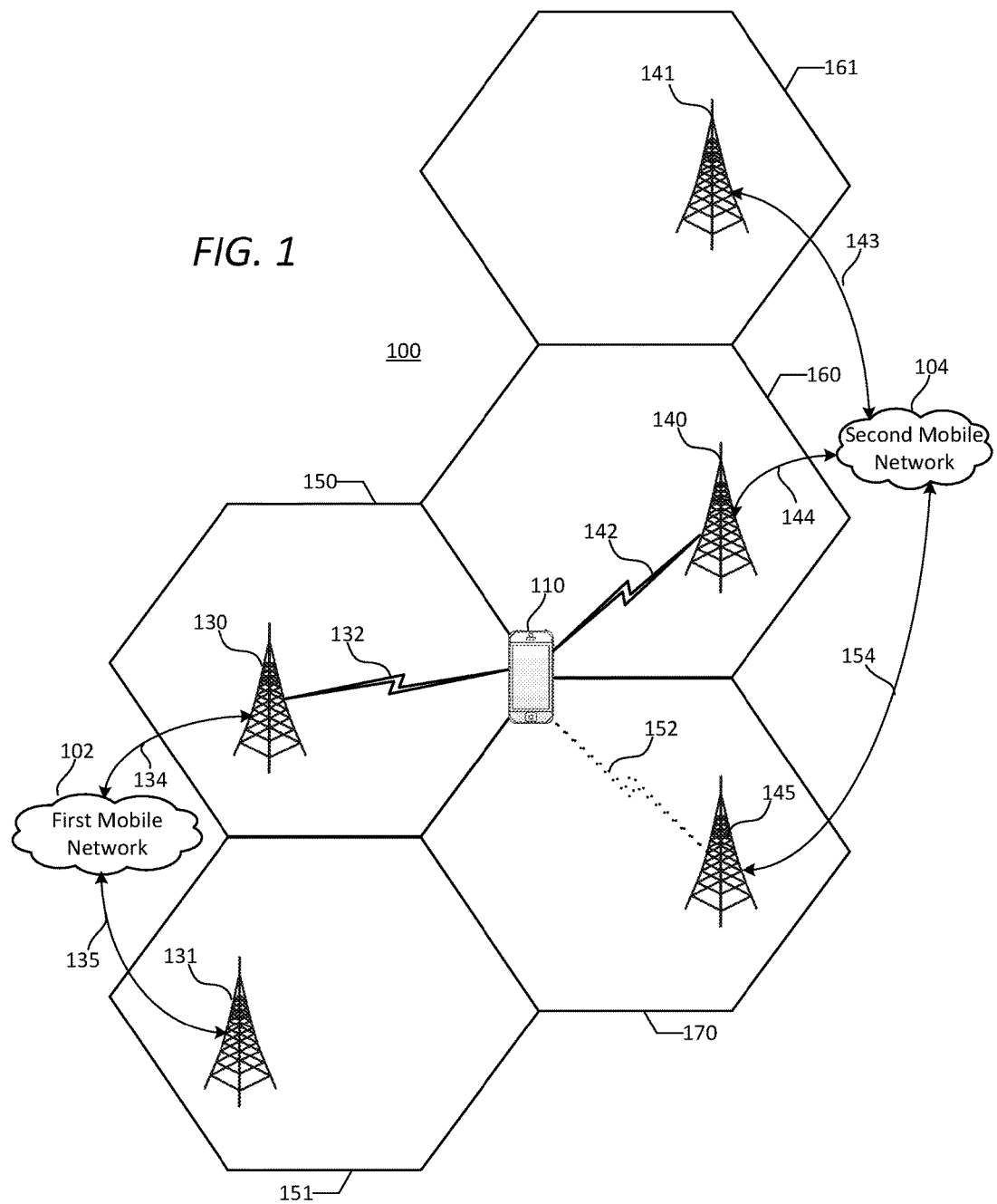
FIG. 1 is a schematic diagram of a communication system in accordance with various examples.

Various examples will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Some modern communication devices, referred to herein as a wireless communication device, User Equipment (UE), or Mobile Station (MS), may include any one or all of cellular telephones, smart phones, personal or mobile multimedia players, personal data assistants, laptop computers, personal computers, tablet computers, smart books, palmtop computers, wireless electronic mail receivers, multimedia Internet-enabled cellular telephones, wireless gaming controllers, and similar personal electronic devices. Such a wireless communication device may include at least one Subscriber Identity Module (SIM), a programmable processor, memory, and circuitry for connecting to two or more mobile communication networks.

A wireless communication device may include one or more SIMs that provide users of the wireless communication devices with access to one or multiple separate mobile communication networks. The mobile communication networks may be supported by Radio Access Technologies (RATs). The wireless communication device may be configured to connect to one or more base stations via one or more RATs. Examples of RATs may include, but not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS), Wideband Code Division Multiple Access (WCDMA), Long Term Evolution (LTE), evolved Multimedia Broadcast Multicast Services (eMBMS), High-Speed Downlink Packet Access (HSDPA), and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network. Each RAT may be associated with a subscription or SIM.

A wireless communication device provided with a plurality of SIMs and connected to two or more subscriptions or networks with one subscription or network being active at a given time is a Multi-SIM-Multi-Standby (MSMS) communication device. In one example, the MSMS communication device may be a Dual-SIM-Dual-Standby (DSDS) communication device, which may include two SIMs that may both be active on standby, but one is deactivated when the other one is in use. In another example, the MSMS communication device may be a Triple-SIM-Triple-Standby (TSTS) communication device, which includes three SIMs that may all be active on standby, where two may be deactivated when the third one is in use. In other examples, the MSMS communication device may be other suitable multi-SIM communication devices, with, for example, four or more SIMs, such that when one is in use, the others may be deactivated.

On the other hand, a wireless communication device that includes a plurality of SIMs and connects to two or more subscriptions or networks with two or more subscriptions or networks being active at a given time may be a MSMA communication device. An example MSMA communication device may be a Dual-SIM-Dual-Active (DSDA) communication device, which may include two SIM. Both SIMs may remain active. In another example, the MSMA device may be a Triple-SIM-Triple-Active (TSTA) communication device, which may include three SIM. All three SIMs may remain active. In other examples, the MSMA communication device may be other suitable multi-SIM communication devices with four or more SIMs, all of which may be active.

Generally, examples described herein may be applicable to a wireless communication device having a shared Radio Frequency (RF) resource and/or a MSMS wireless communication device having at least a first SIM and a second SIM. Illustrating with a non-limiting example, the first SIM may be associated with a first subscription via a first RAT, and the second SIM may be associated with a second subscription via a second RAT or third RAT. The examples may also be applicable to a MSMA wireless communication device that halts first subscription communication activities due to blanking pattern, power back-off, interference, and/or the like when the second subscription receives pages or other types of communications, vice versa.

As used herein, the terms "SIM," "SIM card," and "subscriber identification module" may be used interchangeably to refer to a memory that may be an integrated circuit or embedded into a removable card, and that stores an International Mobile Subscriber Identity (IMSI), related key, and/or other information used to identify and/or authenticate a wireless device on a network and enable communication services with the network. Because the information stored in a SIM may be the wireless device to establish a communication link for a particular communication service with a particular network, the term "SIM" may also be used herein as a shorthand reference to the communication service (e.g., the networks, the subscriptions, the services, and/or the like) associated with and enabled by the information (e.g., in the form of various parameters) stored in a particular SIM as the SIM and the communication network, as well as the services and RATs supported by that network, correlate to one another.

Various examples may be implemented within a communication system 100, an example of which is illustrated in FIG. 1. Referring to FIG. 1, a first mobile network 102 and second mobile network 104 may each associate with a plurality of cellular base stations. For instance, a first base station 130 and first neighbor station 131 neighboring the first base station 130 may provide the first mobile network 102. A second base station 140, third base station 145, and second neighbor station 141 neighboring the second base station 140 may provide the second mobile network 104. The first base station 130 may broadcast the first mobile network 102 in a first serving cell 150. The first neighbor base station 131 may broadcast the first mobile network 102 in a first neighbor cell 151 neighboring the first serving cell 150. The second base station 140 may broadcast the second mobile network 104 in a second serving cell 160. The third base station 145 may broadcast the second mobile network 104 in a third serving cell 170. The second neighbor station 141 may broadcast the second mobile network 104 in a second neighbor cell 161 neighboring the second serving cell 160.

A wireless communication device 110 may be associated with (within effective boundaries of) the first serving cell 150, second serving cell 160, and third serving cell 170. Cell reselection or handover can be performed when the wireless communication device 110 is moved within the boundaries of the first neighbor cell 151 to reselect or handover to the first neighbor cell 151 (and the first neighbor station 131) from the first serving cell 150 (and the first base station 130). Similarly, cell reselection or handover can be performed when the wireless communication device 110 is moved within the boundaries of the second neighbor cell 161 to reselect or handover to the second neighbor cell 161 (and the second neighbor station 141) from the second serving cell 160 (and the second base station 140).

The first base station 130 may be in communication with the first mobile network 102 over a wired or wireless connection 134. The second base station 140 may be in communication with the second mobile network 104 over a wired or wireless connection 144. The third base station 145 may be in communication with the second mobile network 104 over a wired or wireless connection 154. The first neighbor station 131 may be in communication with the first mobile network 102 over a wired or wireless connection 135. The second neighbor station 141 may be in communication with the second mobile network 104 over a wired or wireless connection 143.

The wireless communication device 110 may be in communication with the first mobile network 102 through a first cellular connection 132 to the first base station 130. The first cellular connection 132 may correspond to the first RAT on a first subscription (first SIM) of the wireless communication device 110. The first neighbor cell 151 may establish a cellular connection with the wireless communication device 110 via the first RAT. In other words, the first neighbor cell 151 may be an intra-RAT neighbor cell to the first serving cell 150.

The wireless communication device 110 may be in communication with the second mobile network 104 through a second cellular connection 142 to the second base station 140 or a third cellular connection 152 to the third base station 145. The second cellular connection 142 may correspond to the second RAT of the wireless communication device 110. The third cellular connection 152 may correspond to a third RAT of the wireless communication device 110. The operator of the second mobile network 104 may provide the second RAT and third RAT for a second subscription (second SIM). In some examples, the second RAT is a preferred RAT, with improved data throughput and reliability as compared to the third RAT. The wireless communication device 110 may be configured to reselect or handover to the third RAT from the second RAT, vice versa, in an inter-RAT reselection or handover. Thus, the third serving cell 170 may be an inter-RAT neighbor cell to the second serving cell 160. The second neighbor cell 161 may establish a cellular connection with the wireless communication device 110 via the second RAT. In other words, the second neighbor cell 161 may be an intra-RAT neighbor cell to the second serving cell 160.

The first cellular connection 132, second cellular connection 142, third cellular connection 152 may be made through two-way wireless communication links. Examples of each of the first RAT, second RAT, and third RAT may include, but not limited to, FDMA, TDMA, CDMA (e.g., EVDO), UMTS (e.g., TDS, WCDMA, LTE, eMBMS, HSDPA, or the like), GSM, 1×, GPRS, Wi-Fi, PCS, and/or another protocol used in a wireless communications network or a data communications network.

By way of illustrating with a non-limiting example, the first RAT (employed by the cellular connection 132 and cellular connection with respect to the first neighbor station 131) may be eMBMS, LTE, or another RAT having cyclical activities such as data bursts and pages. The second RAT (employed by the second cellular connection 142 and potential cellular connection with respect to the second neighbor station 161) may be WCDMA, TDS, 1X, LTE, or another RAT having cyclical activities such as data bursts and pages. The third RAT may be GSM or another RAT having cyclical activities having lengths, periods or cycles different from and not integer multiples or integer factors of the lengths of periods or cycles of the first RAT, vice versa.

Each of the first base station 130, first neighbor base station 131, the second base station 140, second neighbor base station 141, and third base station 145 may include at least one antenna group or transmission station located in the same or different areas. The at least one antenna group or transmission station may be associated with signal transmission and reception. Each base station 130, 131, 140, 141, or 145 may include one or more processors, modulators, multiplexers, demodulators, demultiplexers, antennas, and the like for performing the functions described herein. In some examples, each base station 130, 131, 140, 141, or 145 may be an access point, Node B, evolved Node B (eNodeB or eNB), base transceiver station (BTS), or the like.

In various examples, the wireless communication device 110 may be configured to access the first mobile network 102 and the second mobile network 104 by virtue of the multi-SIM and/or multi-mode SIM configuration of the wireless communication device 110. When a SIM corresponding to a RAT is inserted, the wireless communication device 110 may access the mobile communication network associated with that RAT based on the information stored on the SIM through registrations and call setups. In a scenario in which a SIM (e.g., the second SIM) provides two or more RATs (e.g., the second RAT and third RAT), one of the RATs is selected while another one of the RATs can be reselected or handed over to from the selected RAT.

In some examples, the wireless communication device 110 may establish a wireless connection with a peripheral device (not shown) used in connection with the wireless communication device 110. For example, the wireless communication device 110 may communicate over a Bluetooth® link with a Bluetooth-enabled personal computing device (e.g., a "smart watch"). In some examples, the wireless communication device 110 may establish a wireless connection with a wireless access point (not shown), such as over a Wi-Fi connection. The wireless access point may be configured to connect to the Internet or another network over a wired connection.

Figure 2:
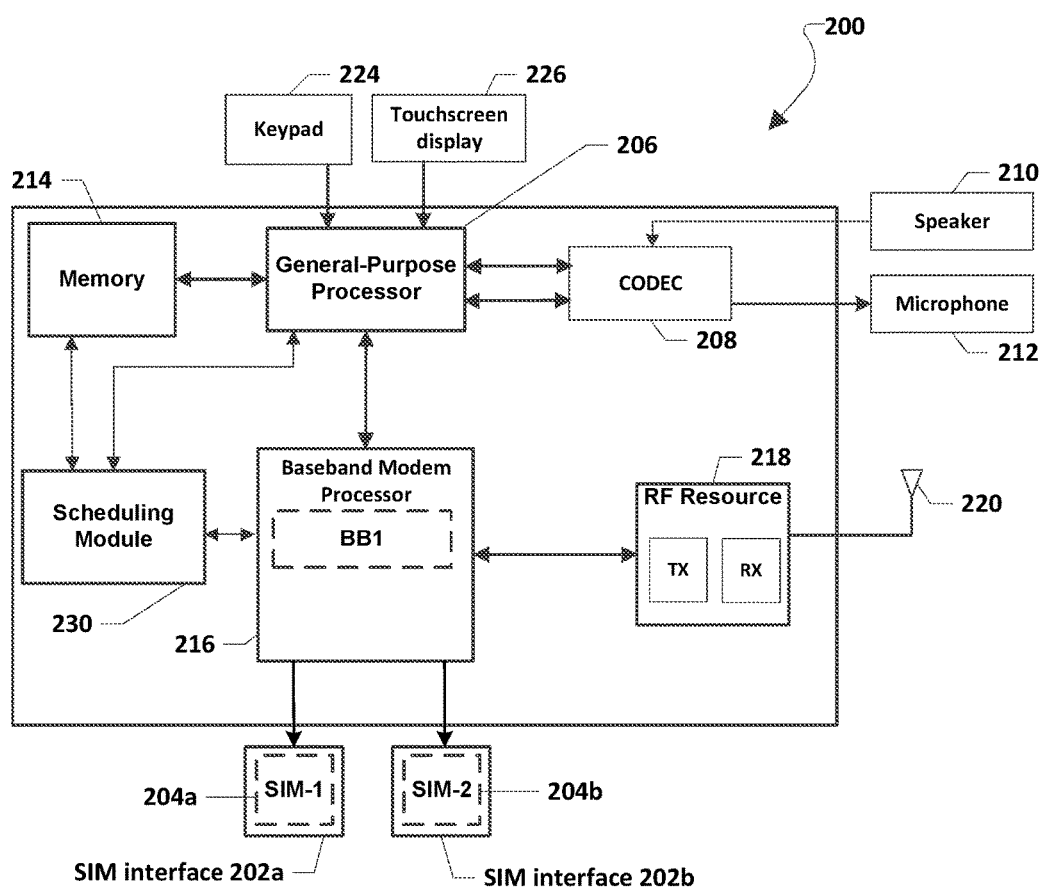
FIG. 2 is a component block diagram of an example of a wireless communication device according to various examples.

FIG. 2 is a functional block diagram of a wireless communication device 200 suitable for implementing various examples. According to various examples, the wireless communication device 200 may be the wireless communication device 110 as described with reference to FIG. 1. Referring to FIGS. 1-2, the wireless communication device 200 may include a first SIM interface 202a, which may receive a first identity module SIM-1 204a that is associated with the first mobile network 102. The wireless communication device 200 may include a second SIM interface 202b, which may receive a second identity module SIM-2 204b that is associated with the second mobile network 104.

A SIM (e.g., SIM-1 204a, SIM-2 204b, and/or the like) in various examples may be a Universal Integrated Circuit Card (UICC) that is configured with SIM and/or Universal SIM (USIM) applications, enabling access to GSM and/or UMTS networks. The UICC may also provide storage for a phone book and other applications. Alternatively, in a CDMA network, a SIM may be a UICC removable user identity module (R-UIM) or a CDMA Subscriber Identity Module (CSIM) on a card. A SIM card may have a Central Processing Unit (CPU), Read Only Memory (ROM), Random Access Memory (RAM), Electrically Erasable Programmable Read-Only Memory (EEPROM) and Input/Output (I/O) circuits. An Integrated Circuit Card Identity (ICCID) SIM serial number may be printed on the SIM card for identification. However, a SIM may be implemented within a portion of memory of the wireless communication device 200, and thus need not be a separate or removable circuit, chip, or card.

A SIM used in various examples may store user account information, an IMSI, a set of SIM Application Toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home Public Land Mobile Network (HPLMN) code, etc.) to indicate the SIM card network operator provider.

The wireless communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The general-purpose processor 206 may include any suitable data processing device, such as a microprocessor. In the alternative, the general-purpose processor 206 may be any suitable electronic processor, controller, microcontroller, or state machine. The general-purpose processor 206 may also be implemented as a combination of computing devices (e.g., a combination of a Digital Signal Processor (DSP) and a microprocessor, a plurality of microprocessors, at least one microprocessor in conjunction with a DSP core, or any other such configuration).

The memory 214 may be a non-transitory processor-readable storage medium that stores processor-executable instructions. For example, the instructions may include routing communication data relating to the first or second subscription though a corresponding baseband-RF resource chain. The memory 214 may include any suitable internal or external device for storing software and data. Examples of the memory 214 may include, but are not limited to, RAM, ROM, floppy disks, hard disks, dongles or other Recomp Sensor Board (RSB) connected memory devices, or the like. The memory 214 may store an Operating System (OS), user application software, and/or executable instructions. The memory 214 may also store application data, such as an array data structure.

The general-purpose processor 206 and the memory 214 may each be coupled to baseband modem processor 216. The SIMs (e.g., the SIM-1 204a, the SIM-2 204b, and/or the like) in the wireless communication device 200 may be associated with at least one baseband-RF resource chain. A baseband-RF resource chain may include the baseband modem processor 216, which may perform baseband/modem functions for communications on the SIMs. The baseband modem processor 216 may include one or more amplifiers and radios, referred to generally herein as a RF resource 218 or RF chain.

The examples described herein may be applicable to wireless communication devices in which the SIMs 204a and 204b share a common set of RF resource (particularly, the RF resource 218). Examples described herein may also be applicable to wireless communication devices in which each of the SIMs 204a and 204b has a separate RF resource, but activities of one of the SIMs 204a and 204b may be deactivated while the other one of the SIMs 204a and 204b is active.

The RF resource 218 may include at least one transceiver that perform transmit/receive functions for the associated SIMs 204a and 204b of the wireless communication device 200. The RF resource 218 may include separate transmit and receive circuitry, or may include a transceiver that combines transmitter and receiver functions. The RF resource 218 may be coupled to a wireless antenna 220. The RF resource 218 may also be coupled to the baseband modem processor 216.

In some examples, the general-purpose processor 206, the memory 214, the baseband modem processor 216, and the RF resource 218 may be included in the wireless communication device 200 as a system-on-chip. In some examples, the SIMs 204a and 204b and their corresponding interfaces 202a, 202b may be external to the system-on-chip. Further, various input and output devices may be coupled to components on the system-on-chip, such as interfaces or controllers. Example user input components suitable for use in the wireless communication device 200 may include, but are not limited to, a keypad 224, a touchscreen display 226, and the microphone 212.

In some examples, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the wireless communication device 200 to enable communication between them.

The wireless communication device 200 may include a scheduling module 230. The scheduling module 230 may configure the RF resource 218 to receive and transmit communications over the first subscription (SIM-1 204*a*) and the second subscription (SIM-2 204*b*) in the manner described. For instance, the scheduling module 230 may configure the RF resource 218 to reselect or handover from the second RAT to the third RAT, vice versa, with respect to the second subscription. The scheduling module 230 may configure the RF resource 218 to reselect or handover to a neighbor cell (e.g., the first neighbor cell 151 or the second neighbor cell 161) in a reselection or handover in the manner described.

In some examples, the scheduling module 230 may be implemented within the general-purpose processor 206. For example, the scheduling module 230 may be implemented as a software application stored within the memory 214 and executed by the general-purpose processor 206. Accordingly, such examples can be implemented with minimal additional hardware costs. However, other examples relate to systems and processes implemented with dedicated hardware specifically configured for performing operations described herein with respect to the scheduling module 230. For example, the scheduling module 230 may be implemented as a separate processing component (i.e., separate from the general-purpose processor 206). The scheduling module 230 may be coupled to the memory 214, the general processor 206, the baseband processor 216, and/or the RF resource 218 for performing the function described herein.

Hardware and/or software for the functions may be incorporated in the wireless communication device 200 during manufacturing, for example, as a part of a configuration of an original equipment manufacturer (OEM) of the wireless communication device 200. In further examples, such hardware and/or software may be added to the wireless communication device 200 post-manufacture, such as by installing one or more hardware devices and/or software applications onto the wireless communication device 200.

In some examples, the wireless communication device 200 may include, among other things, additional SIM cards, SIM interfaces, at least another RF resource associated with the additional SIM cards, and additional antennas for connecting to additional mobile networks.

Figure 3:
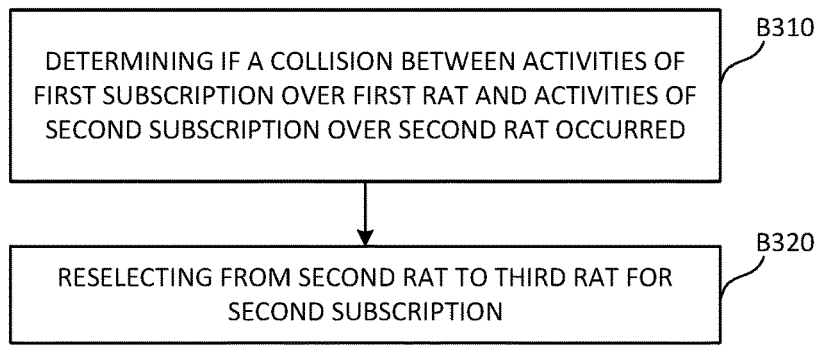
FIG. 3 is a process flowchart diagram illustrating an example of a collision avoidance method according to various examples.

FIG. 3 is a process flowchart diagram illustrating an example of a collision avoidance method 300 according to various examples. In one example, the present method 300 and corresponding apparatus (e.g., the wireless communication device 200) reselects from WCDMA to GSM on the second subscription such that the wireless communication device 200 may avoid consistent collisions between eMBMS (on the first subscription) and a WCDMA page (on the second subscription) or between an LTE page (on the first subscription) and a W page (on the second subscription). Referring to FIGS. 1-3, in some examples, the collision avoidance method 300 may be performed by the scheduling module 230 and/or the general-purpose processor 206 of the wireless communication device 200. At block B310, the scheduling module 230 and/or the general-purpose processor 206 may determine if a collision between activities of the first subscription over the first RAT and the activities of the second subscription over the second RAT occurred. The collisions may be cyclical in nature.

The wireless communication device 110 may be camped on the first serving cell 150 for accessing the first mobile network 102 over the first RAT and on the second serving cell 160 for accessing the second mobile network 104 over the second RAT. The second SIM (e.g., SIM-2 204*b*) may support both the second RAT and the third RAT, with the second RAT as the current serving RAT for the second subscription.

At block B320, the scheduling module 230 and/or the general-purpose processor 206 may be configured to reselect from the second RAT to the third RAT for the second subscription. In other words, the scheduling module 230 and/or the general-purpose processor 206 may configure the RF resource 218 to reselect to the third serving cell 170 (e.g., to camp on the third serving cell 170), in an inter-RAT reselection or handover procedure. In other words, in response to determining that the first RAT collides with the second RAT, the scheduling module 230 and/or the general-purpose processor 206 may reselect to the third RAT, which may have different periodicities than that of the first RAT.

Figure 4:
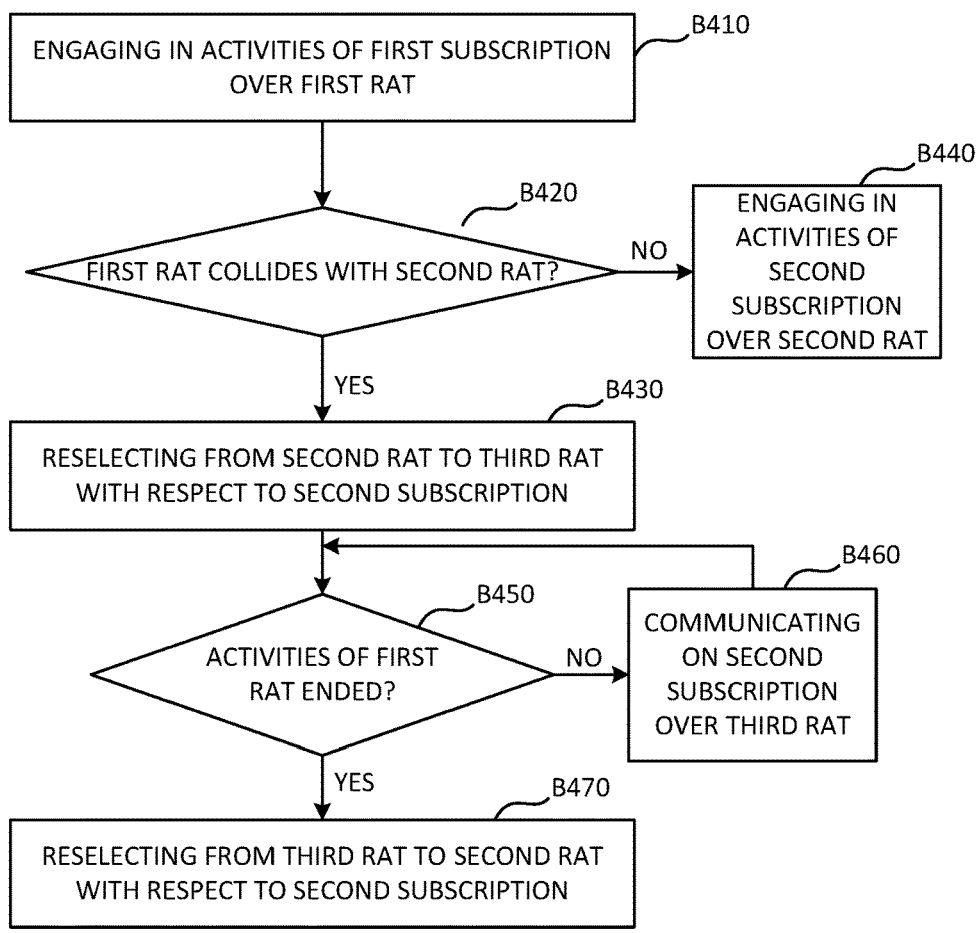
FIG. 4 is a process flowchart diagram illustrating an example of a collision avoidance method according to various examples.
Figure 5:
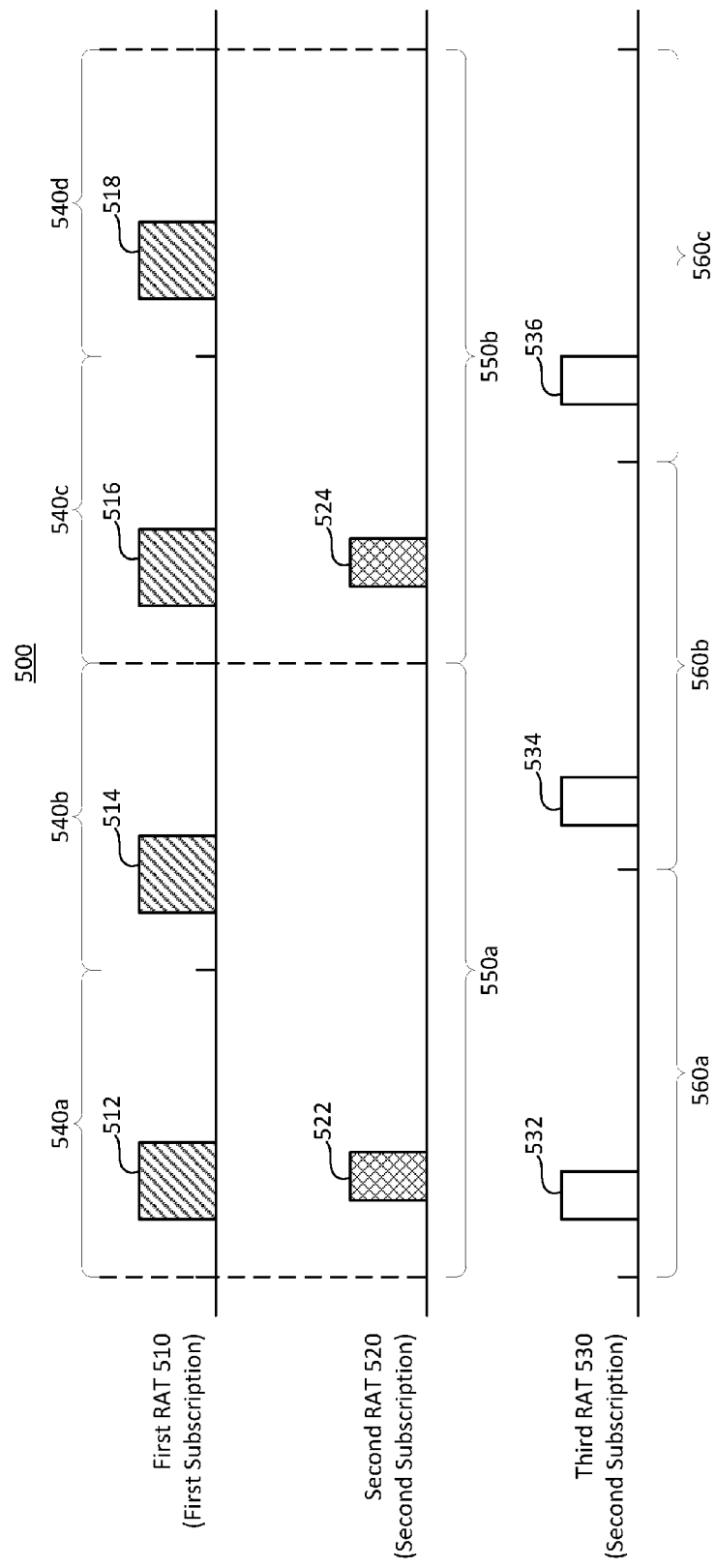
FIG. 5 is a schematic diagram illustrating an example of the collision avoidance method according to some examples

FIG. 4 is a process flowchart diagram illustrating an example of a collision avoidance method 400 according to various examples. FIG. 5 is a schematic diagram 500 illustrating an example of the collision avoidance method 400 (FIG. 4) according to some examples. Referring to FIGS. 1-5, in some examples, the collision avoidance method 400 may be performed by the scheduling module 230 and/or the general-purpose processor 206 of the wireless communication device 200. The diagram 500 illustrates usage of the RF resource 218 by a first RAT 510 (provided by the first subscription), second RAT 520 (provided by the second subscription), and third RAT 530 (provided by the second subscription).

At block B410, the scheduling module 230 and/or the general-purpose processor 206 may configure the RF resource 218 to engage in activities of the first subscription over the first RAT. The activities or the first RAT may include active sessions or scheduled pages. Illustrating with a non-limiting example in which the first RAT 510 is eMBMS, the RF resource 218 may be tuned to the first RAT 510 for data bursts 512, 514, 516, and 518 with respect to a given service of the first RAT 510. A data burst 512, 514, 516, or 518 may be scheduled per a given period 540*a*, 540*b*, 540*c*, or 540*d*, respectively. Each period 540*a*, 540*b*, 540*c*, or 540*d* may be a Multicast Channel (MCH) Scheduling Period (MSP). Illustrating with a non-limiting example, a length of each period 540*a*, 540*b*, 540*c*, or 540*d* may be 80 ms, 160 ms, 320 ms, or the like.

At block B420, the scheduling module 230 and/or the general-purpose processor 206 may determine whether the first RAT collides with the second RAT. Illustrating with a non-limiting example in which the second RAT 520 is WCDMA, activities (e.g., pages 522 and 524) may be scheduled for the second RAT 520 in advance. A page 522 or 524 may be scheduled to be received by the wireless communication device 200 per a given period 550*a* or 550*b*, respectively. Each period 550*a* or 550*b* may be a Discontinuous Reception (DRX) cycle. Illustrating with a non-limiting example, a length of each period 550*a* or 550*b* may be 640 ms, 1.28 s, 5.12 s, or the like.

The length of a period associated with the first RAT may be the same as, an integer multiples of, or an integer factor of the length of a period associated with the second RAT, and vice versa. Illustrating with a non-limiting example, the length of the period 540*a* or 540*b* of the first RAT 510 may be an integer factor of the length of the period 550*a* or 550*b* of the second RAT 520. In such a scenario, a collision between the data burst 512 and page 522 in the period 550*a* can persist in subsequent periods (e.g., the period 550*b*). In one example, the collisions can be persistent because the WCDMA paging cycle may be a multiple of the MSP, for example, the MSP may be 320 ms, while the WCDMA paging cycle is 640 ms.

In response to determining that the first RAT collides with the second RAT (B420:YES), the scheduling module 230 and/or the general-purpose processor 206 may reselect or hand over from the second RAT to the third RAT with respect to the second subscription, at block B430. In other words, the scheduling module 230 and/or the general-purpose processor 206 may configure the RF resource 218 to camp on the third serving cell 170 and to establish the third cellular connection 152 over the third RAT, for example, via location update procedures. A length of a period of the third RAT may be different from and may not be an integer multiple or integer factor of the length of the period of the first RAT, to avoid persistent and periodic collisions.

Illustrating with a non-limiting example in which the third RAT 530 is GSM, a page 532, 534, or 536 may be scheduled per a given period 560*a*, 560*b*, or 560*c*. Each period 560*a*, 560*b*, or 560*c* may correspond a GSM DRX cycle. Examples of the length of the GSM DRX cycle may include, but not limited to, 470 ms which will not have consistent collision problems with the eMBMS data burst. As shown in the diagram 500, while some collisions (e.g., between the data burst 512 and page 532) may occur, persistent collisions can be avoided given that the length of each period 560*a*, 560*b*, or 560*c* may be different from and may not be an integer multiple or integer factor of the length of each period 540*a*, 540*b*, 540*c*, or 540*d*, vice versa.

At block B450, the scheduling module 230 and/or the general-purpose processor 206 may determine whether the activities of the first RAT have ended. For instance, an active broadcasting session (in which the data bursts 512, 514, 516, and 518) may be broadcasted from the first mobile network 102 on the first RAT 510 may be deactivated or interrupted. In response to determining that the activities of the first RAT have not ended (B450:NO), the scheduling module 230 and/or the general-purpose processor 206 may continue to communicate (e.g., monitor pages) on the second subscription over the third RAT, at block B460. The method 500 resumes at block B450 thereafter.

On the other hand, in response to determining that the activities of the first subscription have ended (B450:YES), the scheduling module 230 and/or the general-purpose processor 206 may reselect or hand over from the third RAT back to the second RAT with respect to the second subscription, at block B470. In other words, the scheduling module 230 and/or the general-purpose processor 206 may configure the RF resource 218 to camp on the second serving cell 160 over the second RAT, for example, via location update procedures. As the second RAT may be the preferred RAT of the second subscription due to high data throughput and reliability, when the collision scenario no longer applies, the second RAT may again be used for the second subscription, instead of the third RAT.

In response to determining that the first RAT does not collide with the second RAT (B420:NO), the scheduling module 230 and/or the general-purpose processor 206 may continue to engage in the activities of the second subscription over the second RAT, at block B440.

While the schematic diagram 500 is discussed herein using a non-limiting example concerning eMBMS as the first RAT 510, WCDMA as the second RAT 520, and GSM as the third RAT 530, one of ordinary skill in the art would appreciate that the method 400 is applicable to other RATs and types of communication activities as long as the length of the periods of the third RAT may be different from and not integer multiples or integer factors of the length of the periods of the first RAT.

Figure 6:
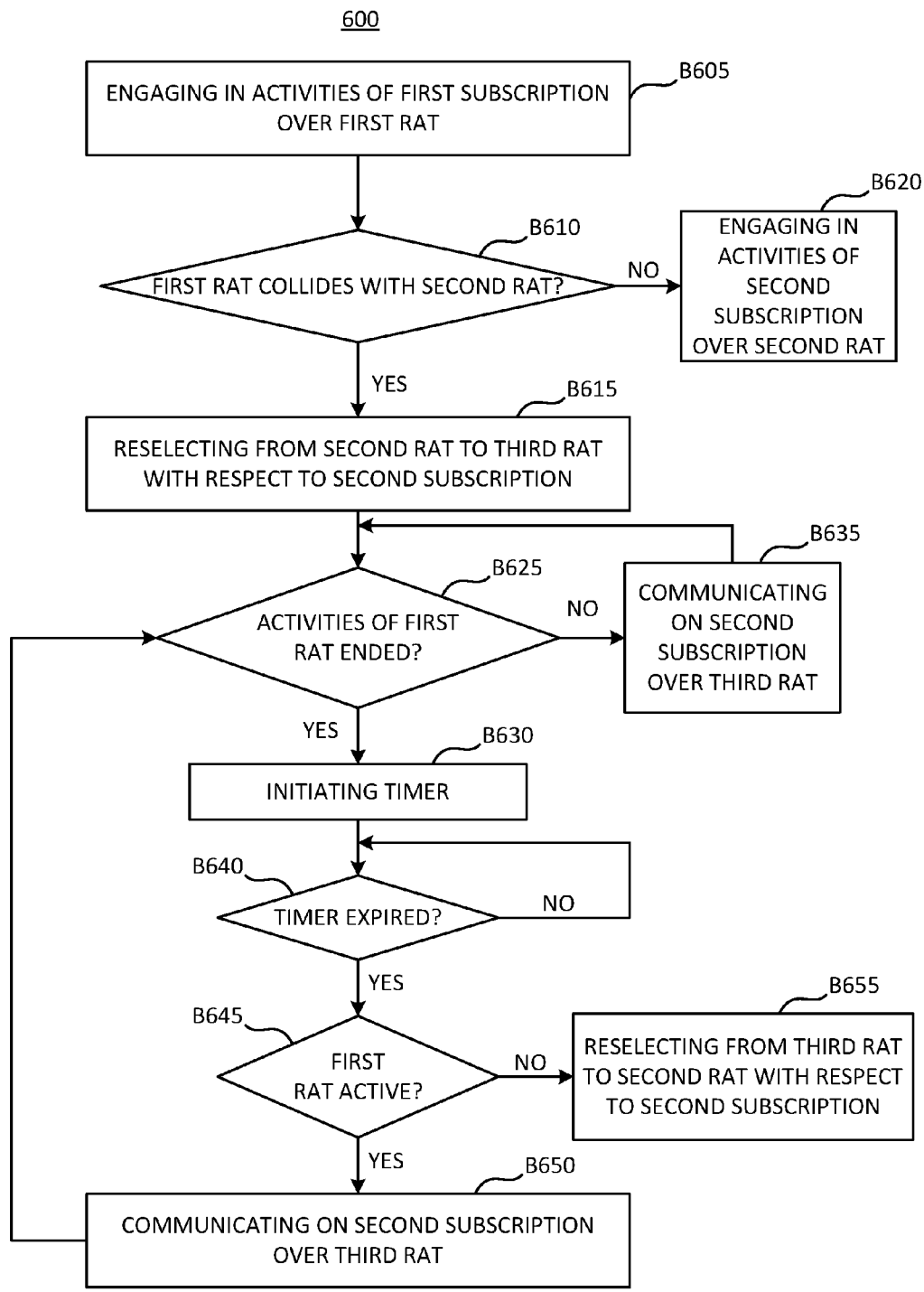
FIG. 6 is a process flowchart diagram illustrating an example of a collision avoidance method according to various examples.
Figure 7:
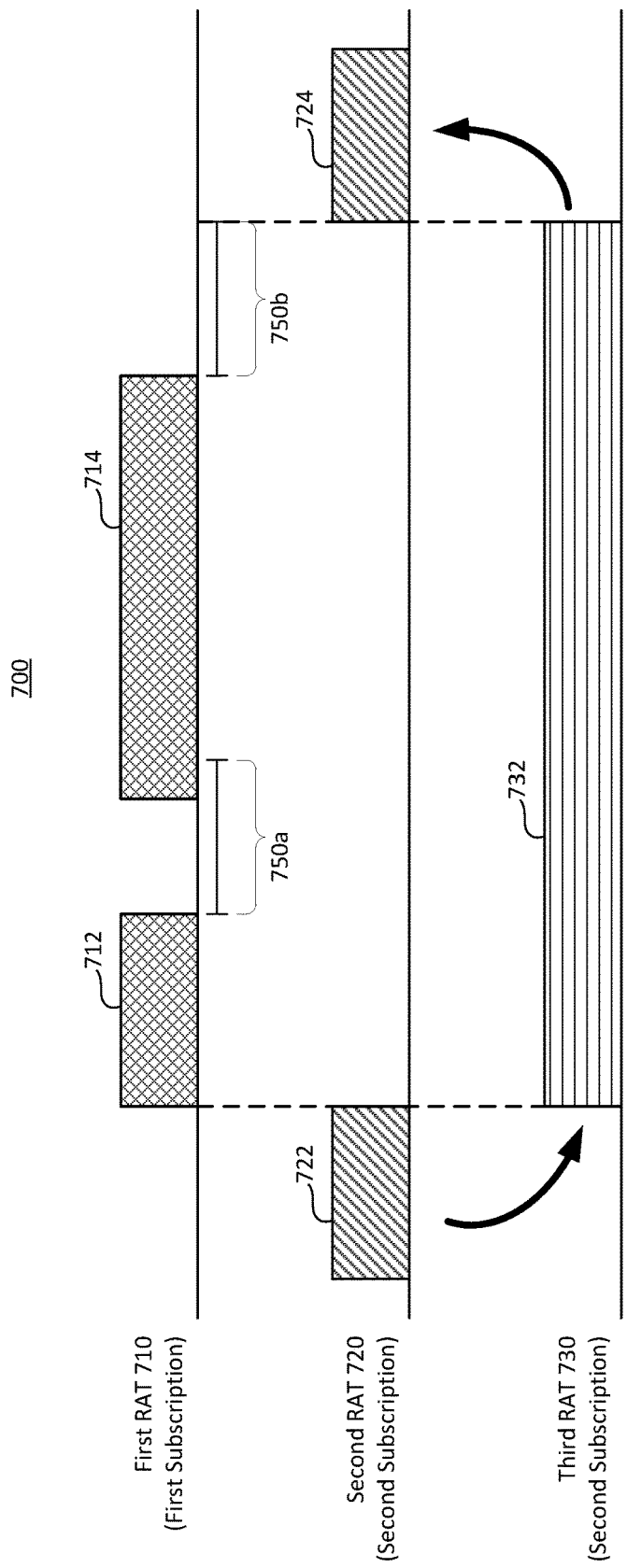
FIG. 7 is a schematic diagram illustrating an example of the collision avoidance method according to some examples.

FIG. 6 is a process flowchart diagram illustrating an example of a collision avoidance method 600 according to various examples. FIG. 7 is a schematic diagram 700 illustrating an example of the collision avoidance method 600 (FIG. 6) according to some examples. Referring to FIGS. 1-7, in some examples, the collision avoidance method 600 may be performed by the scheduling module 230 and/or the general-purpose processor 206 of the wireless communication device 200. The diagram 700 illustrates usage of the RF resource 218 by a first RAT 710 (provided by the first subscription), second RAT 720 (provided by the second subscription), and third RAT 730 (provided by the second subscription). In the non-limiting example presented by the diagram 700, the first RAT 710 may be eMBMS, the second RAT 720 may be WCDMA, and the third RAT 730 may be GSM.

The collision avoidance method 600 addresses a Ping-Pong effect caused by returning to the preferred second RAT too rapidly when a user of the wireless communication device deactivates and activates services of the first RAT in a relatively short time span. Illustrating with a non-limiting example, a user of services of the first subscription (the first RAT 710) may deactivate first activities 712 and then activating second activities 714 after a relatively short gap 750*a*. This may pertain to a scenario in which the user accidentally switches off a broadcast on the first subscription, then quickly switches the broadcast back on. If reselection back to the second RAT 720 occurs when the first activities 712 are deactivated, reselection to the third RAT 730 may again be performed in response to the second activities 714 being activated, resulting in unnecessary waste of power due to camping activities.

Each of blocks B605, B610, B615, B620, B625, and B635 corresponds to blocks B410, B420, B430, B440, B450, and B460, respectively. For instance, at block B605, the scheduling module 230 and/or the general-purpose processor 206 may configure the RF resource 218 to engage in activities (e.g., the first activities 712) of the first subscription over the first RAT. The first activities 712 may include data bursts such as, but not limited to, the data bursts 512, 514, 516, and 518. At block B610, the scheduling module 230 and/or the general-purpose processor 206 may determine whether the first RAT (e.g., the first RAT 710) collides with the second RAT (e.g., the second RAT 720). In response to determining that the first RAT does not collide with the second RAT (B610:NO), the scheduling module 230 and/or the general-purpose processor 206 may continue to engage in the activities of the second subscription over the second RAT, at block B620.

In the non-limiting example presented in diagram 700, second-RAT activities 722 may include pages (such as, but not limited to pages 522 and 524) that persistently collide with cyclic activities of the first activities 712. In response to determining that the first RAT 710 collides with the second RAT 720 (B610:YES), the scheduling module 230 and/or the general-purpose processor 206 may reselect or hand over from the second RAT to the third RAT with respect to the second subscription, at block B615. In some examples, third-RAT activities 732 such as page monitoring may be performed on the third RAT 730. Given that the length of a period of the third RAT 730 may be different from and may not be an integer multiple or integer factor of the length of the period of the first RAT 710, persistent collisions can be avoided.

At block B625, the scheduling module 230 and/or the general-purpose processor 206 may determine whether the activities (e.g., the first activities 712) of the first RAT (e.g., the first RAT 710) have ended. In response to determining that the activities of the first RAT have not ended (B625: NO), the scheduling module 230 and/or the general-purpose processor 206 may continue to communicate (e.g., monitor pages) on the second subscription over the third RAT (e.g., the third RAT 730), at block B635.

On the other hand, in response to determining that the activities of the first RAT have ended (B625:YES), the scheduling module 230 and/or the general-purpose processor 206 may initiate a timer (e.g., the timer 750a or 750b), at block B630. The timer may be configured to be 1.5 times or twice as long as it would typically take for a user to accidentally deactivate the services on the first subscription and activating it. In some examples, the timer may be configured to be 10-20 s or 10-30 s long. In some examples, the timer may have a length of 5 s, 10 s, 15 s, 20 s, 25 s, or the like.

At block B640, the scheduling module 230 and/or the general-purpose processor 206 may determine whether the timer has expired. In response to determining that the timer has not expired (B640:NO), the method 600 continues at block B640 until the timer has expired. In response to determining that the timer has expired (B640:YES), the scheduling module 230 and/or the general-purpose processor 206 may determine whether the first RAT is still active at the time, at block B645. For example, the first RAT 710 may be active as an active session (including periodic data bursts) for services of the first RAT is ongoing.

Illustrating with a non-limiting example, when the timer 750a has expired (e.g., B640:YES), the first RAT 710 is active, given that the second activities 714 may be initiated during the interval of the timer 750a, and that the second activities 714 may be ongoing when the timer 750a expires. In response to determining that the first RAT 710 is active when the timer expires (B645:YES), the scheduling module 230 and/or the general-purpose processor 206 may continue to communicate on the second subscription over the third RAT 730, at block B650. In other words, the third-RAT activities 732 may not be interrupted by reselection or handover back to the second RAT 720 when the timer 750a expires. Thereafter, the method 600 resumes at block B625.

When the timer 750b expires (e.g., B640:YES), the first RAT 710 may no longer be active (B645:NO). In response to determining that the first RAT 710 is inactive when the timer expires (B645:NO), the scheduling module 230 and/or the general-purpose processor 206 may reselect or handover from the first RAT 730 to the second RAT 720 with respect to the second subscription. After successful camp-on, second RAT activities 724, such as page monitoring, may be performed.

While the schematic diagram 700 is discussed herein using a non-limiting example concerning eMBMS as the first RAT 710, WCDMA as the second RAT 720, and GSM as the third RAT 730, one of ordinary skill in the art would appreciate that the method 600 is applicable to other RATs and types of communication activities. In addition, the timer is a hysteresis timer.

Figure 8:
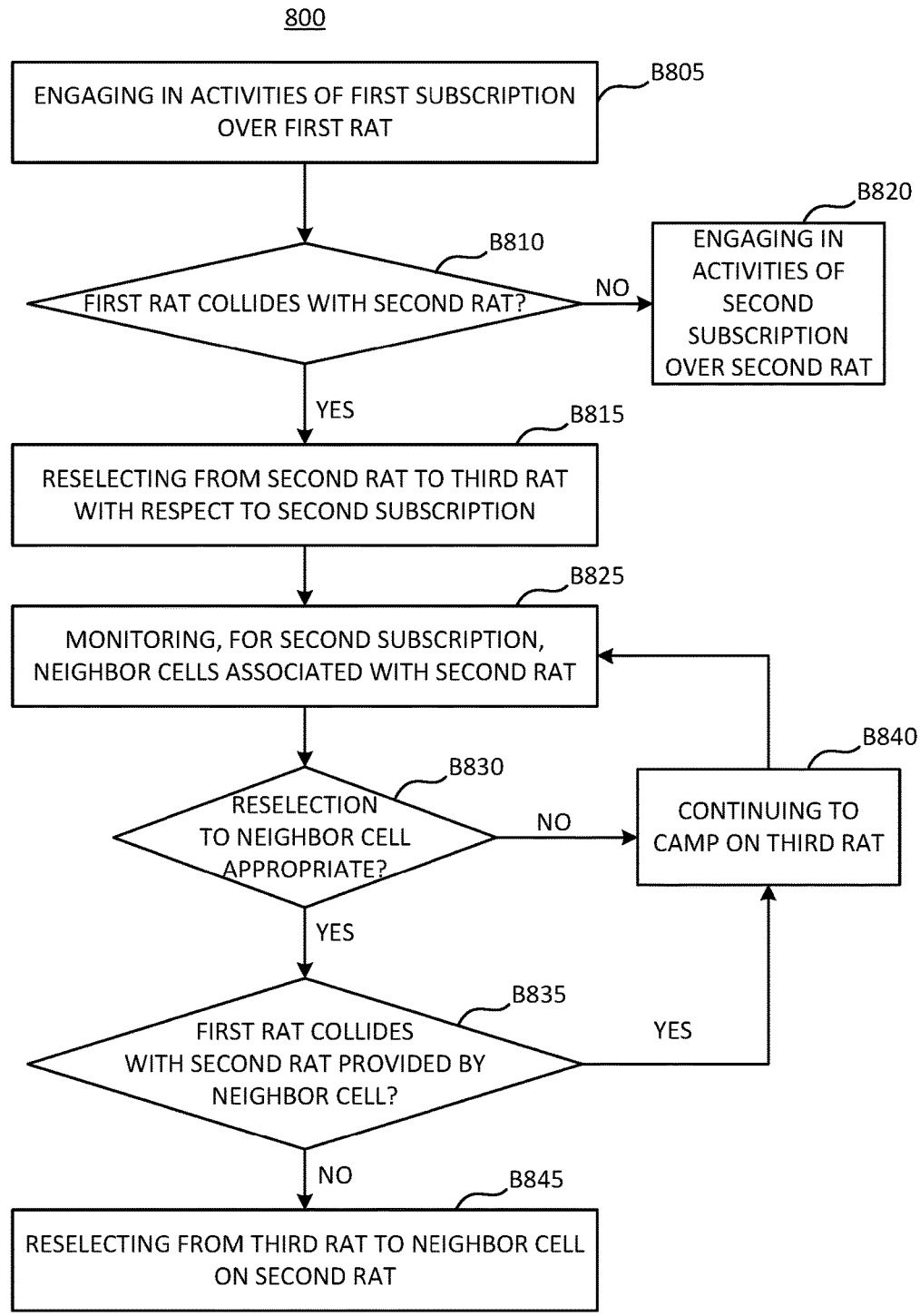
FIG. 8 is a process flowchart diagram illustrating an example of a collision avoidance method according to various examples.
Figure 9:
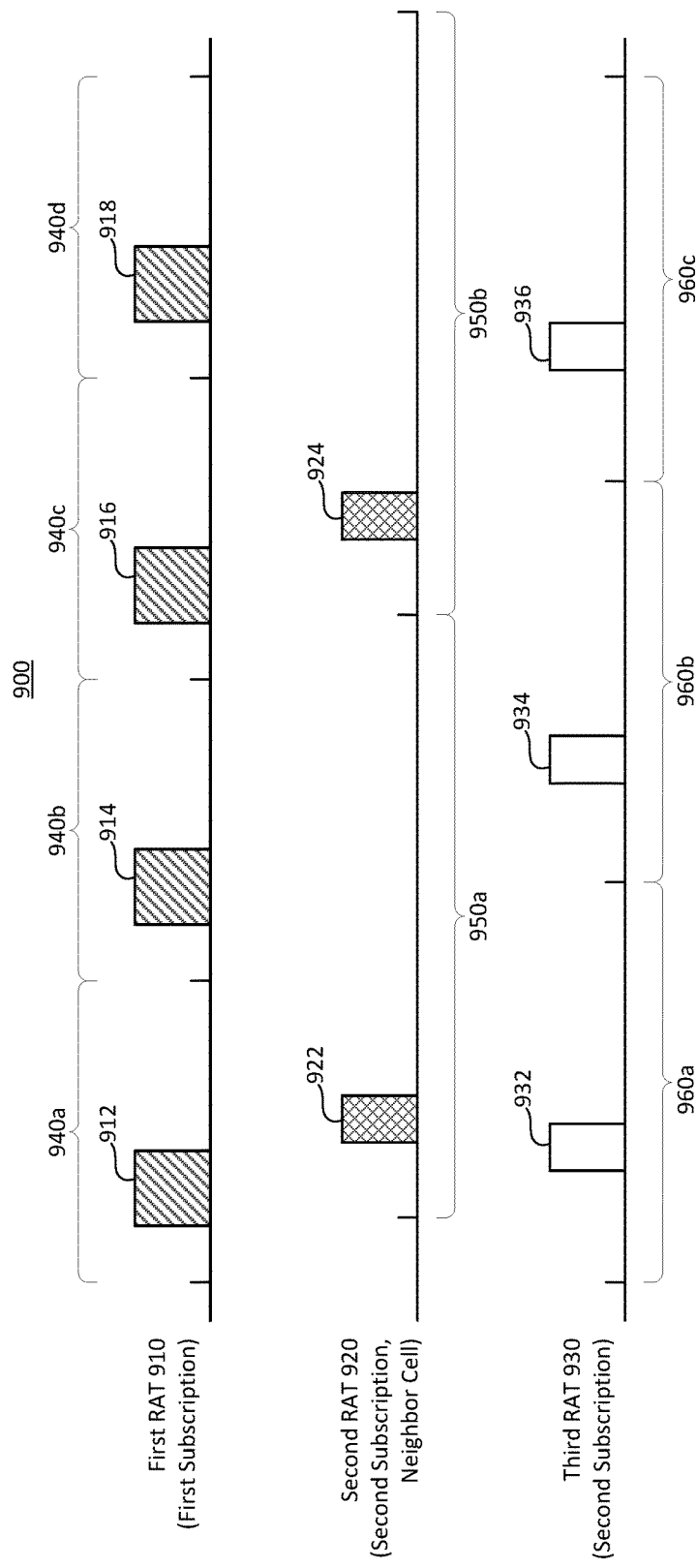
FIG. 9 is a schematic diagram illustrating an example of the collision avoidance method according to some examples.

FIG. 8 is a process flowchart diagram illustrating an example of a collision avoidance method 800 according to various examples. FIG. 9 is a schematic diagram 900 illustrating an example of the collision avoidance method 800 (FIG. 8) according to some examples. Referring to FIGS. 1-5 and 8-9, in some examples, the collision avoidance method 800 may be performed by the scheduling module 230 and/or the general-purpose processor 206 of the wireless communication device 200. The diagram 900 illustrates usage of the RF resource 218 by a first RAT 910 (provided by the first subscription), second RAT 920 (provided by the second subscription on the second neighbor cell 161), and third RAT 930 (provided by the second subscription). In the non-limiting example presented by the diagram 900, the first RAT 910 may be LTE, the second RAT 920 may be WCDMA, and the third RAT 930 may be GSM.

When the wireless communication device 200 reselects or hands over to the third RAT, the wireless communication device 200 may nevertheless monitor neighbor cells (e.g., the second neighbor cell 161) neighboring the second serving cell 160 for reselection or handover on the second RAT. The collision avoidance method 900 allows the wireless communication device 200 to camp a second-RAT neighbor cell that meets reselection or handover criteria when the activities of the first RAT do not collide with the activities of the second RAT supported by the neighbor cell. This scenario occurs when the second mobile network 104 is asynchronous, meaning the different cells may have different schedules for communication.

Each of blocks B805, B810, B815, and B820 corresponds to blocks B410, B420, B430, and B440, respectively. For instance, at block B805, the scheduling module 230 and/or the general-purpose processor 206 may configure the RF resource 218 to engage in activities of the first subscription over the first RAT. In some examples, the activities of the first subscription may include pages 912, 914, 916, and 918 on the first RAT 910. Each page 912, 914, 916, or 918 may be scheduled per a given period 940a, 940b, 940c, or 940d, respectively. Each period 940a, 940b, 940c, or 940d may be a DRX cycle.

At block B810, the scheduling module 230 and/or the general-purpose processor 206 may determine whether the first RAT collides with the second RAT, in the manner described herein. In response to determining that the first RAT does not collide with the second RAT (B810:NO), the scheduling module 230 and/or the general-purpose processor 206 may continue to engage in the activities of the second subscription over the second RAT, at block B820. On the other hand, in response to determining that the first RAT collides with the second RAT (B810:YES), the scheduling module 230 and/or the general-purpose processor 206 may reselect or hand over from the second RAT to the third RAT with respect to the second subscription, at block B815. A length of a period (e.g. periods 960a, 960b, 960c) of the third RAT (e.g., the third RAT 930) may be different from and may not be an integer multiple or integer factor of the length of the period of the first RAT, to avoid persistent and periodic collisions. Illustrating with a non-limiting example, activities (e.g., pages 932, 934, and 936) or the third RAT 930 may not persistently collide with the activities (e.g., the pages 912, 914, 916, and 918) of the first IRAT 910.

At block B825, the scheduling module 230 and/or the general-purpose processor 206 may monitor, for the second subscription, neighbor cells associated with the second RAT. For example, the scheduling module 230 and/or the general-purpose processor 206 may perform cell measurements for reselection and handover to one of the neighbor cells associated with the second RAT after reselecting to the third RAT. The neighbor cells associated with the second RAT may include the second neighbor cell 161.

At block B830, the scheduling module 230 and/or the general-purpose processor 206 may determine whether reselection or handover to one (e.g., the second neighbor cell 161) of the neighbor cells is appropriate. For instance, reselection or handover to the second neighbor cell 161 may be appropriate in response to determining that cell measurements performed at block B825 indicate that the second neighbor cell 161 meets reselection or handover criteria. This may occur when the wireless communication device 200 has been moved to within the boundaries of the second neighbor cell 161 and away from the boundaries of the second serving cell 160. In response to determining that reselection or handover is not appropriate (B830:NO), the scheduling module 230 and/or the general-purpose processor 206 may continue to camp on the third RAT (e.g., the third serving cell 170), at block B840. Thereafter, the scheduling module 230 and/or the general-purpose processor 206 may continue to monitor neighbor cells supporting the second RAT, at block B825.

On the other hand, in response to determining that reselection or handover is appropriate (B830:YES), the scheduling module 230 and/or the general-purpose processor 206 may determine whether the first RAT collides with the second RAT (supported by the second neighbor cell 161 that meets the reselection or handover criteria), at block B835. In response to determining that the first RAT collides with the second RAT (with respect to the neighbor cell) (B835:YES), the scheduling module 230 and/or the general-purpose processor 206 may continue to camp on the third RAT (e.g., the third serving cell 170), at block B840. Thereafter, the scheduling module 230 and/or the general-purpose processor 206 may continue to monitor neighbor cells associated with the second RAT, at block B825.

On the other hand, in response to determining that the first RAT does not collide with the second RAT (with respect to the neighbor cell) (B835:NO), the scheduling module 230 and/or the general-purpose processor 206 may reselect from the third RAT to the neighbor cell (e.g., the second neighbor cell 161) on the second RAT, at block B845. Illustrating with a non-limiting example, pages 922 and 924 may be scheduled for the second RAT 920 supported by the second neighbor cell 161 in advance. A page 922 or 924 may be scheduled to be received by the wireless communication device 200 per a given period 950a or 950b, respectively. Each period 950a or 950b may be a DRX cycle. The length of the period 940a, 940b, 940c, or 940d associated with the first RAT 910 may be the same as, an integer multiples of, or an integer factor of the length of a period 950a or 950b associated with the second RAT 920, vice versa. The pages 922 and 924 do not collide with any of the pages 912, 914, 916, and 918. Due to that the activities of the first RAT 910 do not collide with the activities of the second RAT 920 supported by the second neighbor cell 161 in a given period 950a, persistent collision would not occur in any subsequent periods.

While the schematic diagram 900 is discussed herein using a non-limiting example concerning LTE as the first RAT 910, WCDMA as the second RAT 920, and GSM as the third RAT 930, one of ordinary skill in the art would appreciate that the method 800 is applicable to other RATs and types of communication activities.

Figure 10:
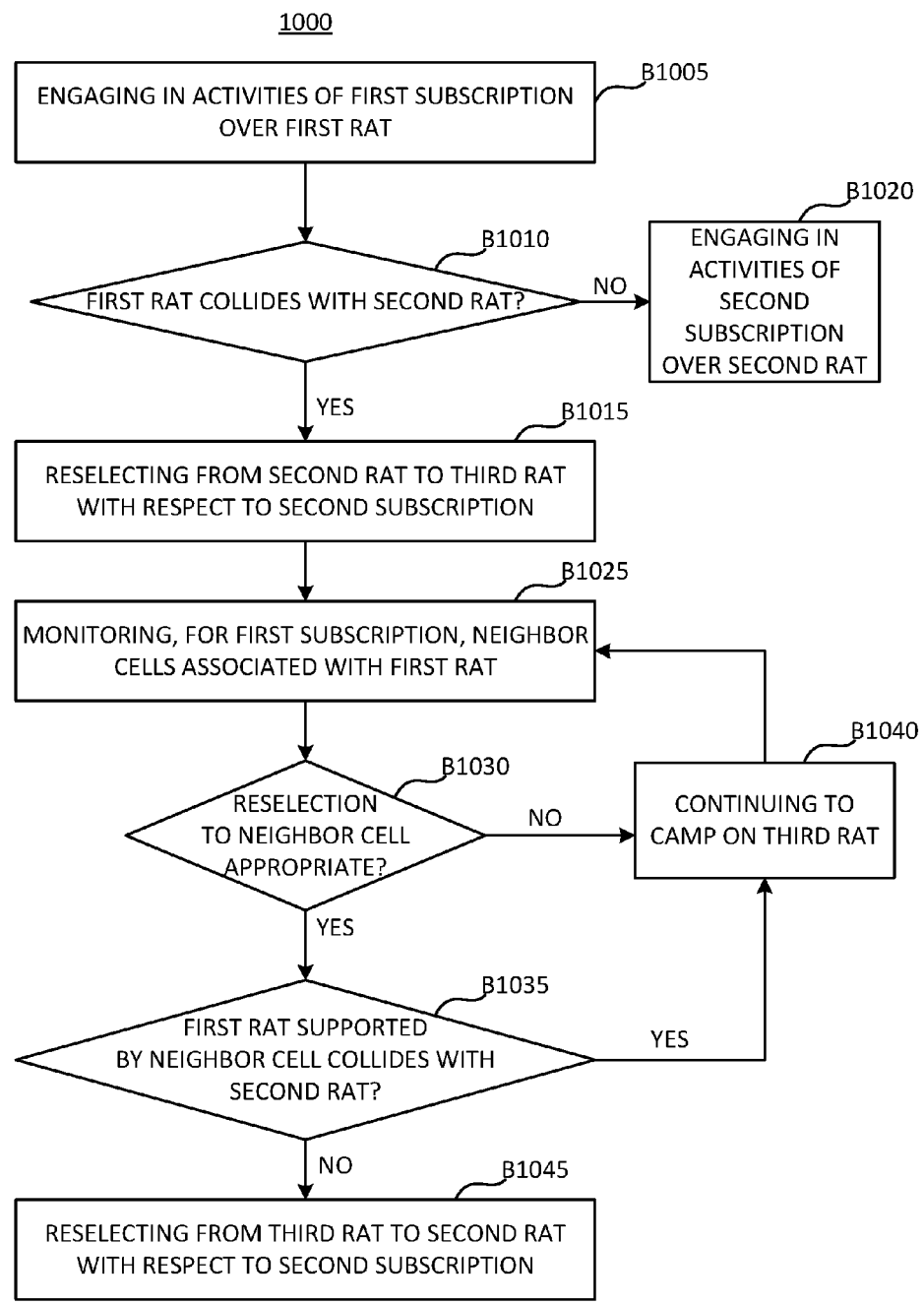
FIG. 10 is a process flowchart diagram illustrating an example of a collision avoidance method according to various examples.
Figure 11:
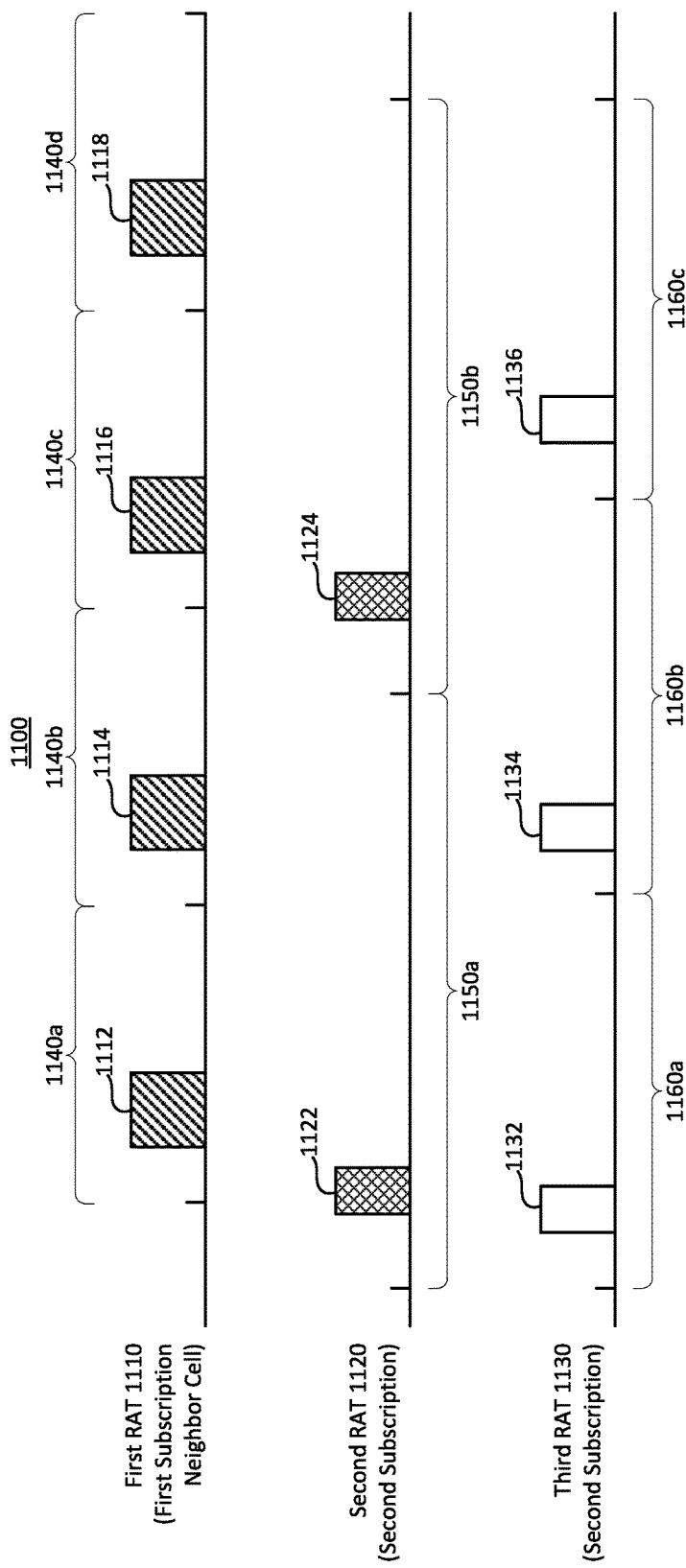
FIG. 11 is a schematic diagram illustrating an example of the collision avoidance method according to some examples.

FIG. 10 is a process flowchart diagram illustrating an example of a collision avoidance method 1000 according to various examples. FIG. 11 is a schematic diagram 1100 illustrating an example of the collision avoidance method 1000 (FIG. 10) according to some examples. Referring to FIGS. 1-5 and 10-11, in some examples, the collision avoidance method 1000 may be performed by the scheduling module 230 and/or the general-purpose processor 206 of the wireless communication device 200. The diagram 1100 illustrates usage of the RF resource 218 by a first RAT 1110 (provided by the first subscription on the first neighbor cell 151), second RAT 1120 (provided by the second subscription), and third RAT 1130 (provided by the second subscription). In the non-limiting example presented by the diagram 1100, the first RAT 1110 may be LTE, the second RAT 1120 may be WCDMA, and the third RAT 1130 may be GSM.

When the wireless communication device 200 reselects or hands over to the third RAT, the wireless communication device 200 may nevertheless monitor cells (e.g., the first neighbor cell 161) neighboring the first serving cell 150 for reselection or handover on the first RAT. The collision avoidance method 1000 allows the wireless communication device 200 to camp a first-RAT neighbor cell that meets reselection or handover criteria when the activities of the first RAT supported by to the neighbor cell do not collide with the activities of the second RAT. Thus scenario occurs within the first mobile network 102 is asynchronous.

Each of blocks B1005, B1010, B1015, and B1020 corresponds to blocks B410, B420, B430, and B440, respectively. For instance, at block B1005, the scheduling module 230 and/or the general-purpose processor 206 may configure the RF resource 218 to engage in activities of the first subscription over the first RAT, in the manner described herein.

At block B1010, the scheduling module 230 and/or the general-purpose processor 206 may determine whether the first RAT collides with the second RAT, in the manner described herein. In response to determining that the first RAT does not collide with the second RAT (B1010:NO), the scheduling module 230 and/or the general-purpose processor 206 may continue to engage in the activities of the second subscription over the second RAT, at block B1020. On the other hand, in response to determining that the first RAT collides with the second RAT (B1010:YES), the scheduling module 230 and/or the general-purpose processor 206 may reselect or hand over from the second RAT to the third RAT with respect to the second subscription, at block B1015. A length of a period (e.g., periods 1160a, 1160b, and 1160c) of the third RAT (e.g., the third RAT 1150) may be different from and may not be an integer multiple or integer factor of the length of the period (e.g., periods 1140a, 1140b, 1140c and 1140d) of the first RAT (e.g., the first RAT 1110), to avoid persistent and periodic collisions. For example, pages 1132, 1134, and 1136 scheduled in periods 1160a, 1160b, and 1160c may not persistently collide with pages 1112, 1114, 1116, and 1118.

At block B1025, the scheduling module 230 and/or the general-purpose processor 206 may monitor, for the first subscription, neighbor cells associated with the first RAT. For example, the scheduling module 230 and/or the general-purpose processor 206 may perform cell measurements for reselection and handover to one of the neighbor cells associated with the first RAT after reselecting to the third RAT. The neighbor cells associated with the first RAT may include the first neighbor cell 151.

At block B1030, the scheduling module 230 and/or the general-purpose processor 206 may determine whether reselection or handover to one (e.g., the first neighbor cell 151) of the neighbor cells is appropriate. For instance, reselection or handover to the first neighbor cell 151 may be appropriate when cell measurements performed at block B1025 indicate that the first neighbor cell 151 meets reselection or handover criteria. This may occur when the wireless communication device 200 has been moved within the boundaries of the first neighbor cell 151 and away from the boundaries of the first serving cell 150. In response to determining that reselection or handover is not appropriate (B1030:NO), the scheduling module 230 and/or the general-purpose processor 206 may continue to camp on the third RAT (e.g., the third serving cell 170), at block B1040. Thereafter, the scheduling module 230 and/or the general-purpose processor 206 may continue to monitor neighbor cells associated with the first RAT, at block B1025.

On the other hand, in response to determining that reselection or handover is appropriate (B1030:YES), the scheduling module 230 and/or the general-purpose processor 206 may camp on the first neighbor cell 151 and determine whether the first RAT (with respect to the first neighbor cell 151 that meets the reselection or handover criteria) collides with the second RAT, at block B1035. In response to determining that the first RAT (with respect to the first neighbor cell 151) collides with the second RAT (B1035: YES), the scheduling module 230 and/or the general-purpose processor 206 may continue to camp on the third RAT (e.g., the third serving cell 170), at block B1040. Thereafter, the scheduling module 230 and/or the general-purpose processor 206 may continue to monitor neighbor cells associated with the second RAT, at block B1025.

On the other hand, in response to determining that the first RAT (supported by the first neighbor cell 151) does not collide with the second RAT (B1035:NO), the scheduling module 230 and/or the general-purpose processor 206 may reselect from the third RAT to the second RAT, at block B1045. Illustrating with a non-limiting example, pages 1122 and 1124 may be scheduled for the second RAT 1120 in advance. A page 1122 or 1124 may be scheduled to be received by the wireless communication device 200 per a given period 1150a or 1150b, respectively. Each period 1150a or 1150b may be a DRX cycle. The length of the period 1140a, 1140b, 1140c, or 1140d associated with the first RAT 1110 may be the same as, an integer multiples of, or an integer factor of the length of a period 1150a or 1150b associated with the second RAT 1120, vice versa. The pages 1122 and 1124 do not collide with any of pages 1112, 1114, 1116 and 1118 on the first RAT 1110 that is supported by the first neighbor cell 151. Due to that the activities of the first RAT 1110 as supported by the first neighbor cell 151 do not collide with the activities of the second RAT 1120 in a given period 1150a, persistent collisions would not occur in any subsequent periods.

While the schematic diagram 1100 is discussed herein using a non-limiting example concerning LTE as the first RAT 1110, WCDMA as the second RAT 1120, and GSM as the third RAT 1130, one of ordinary skill in the art would appreciate that the method 1000 is applicable to other RATs and types of communication activities.

Figure 12:
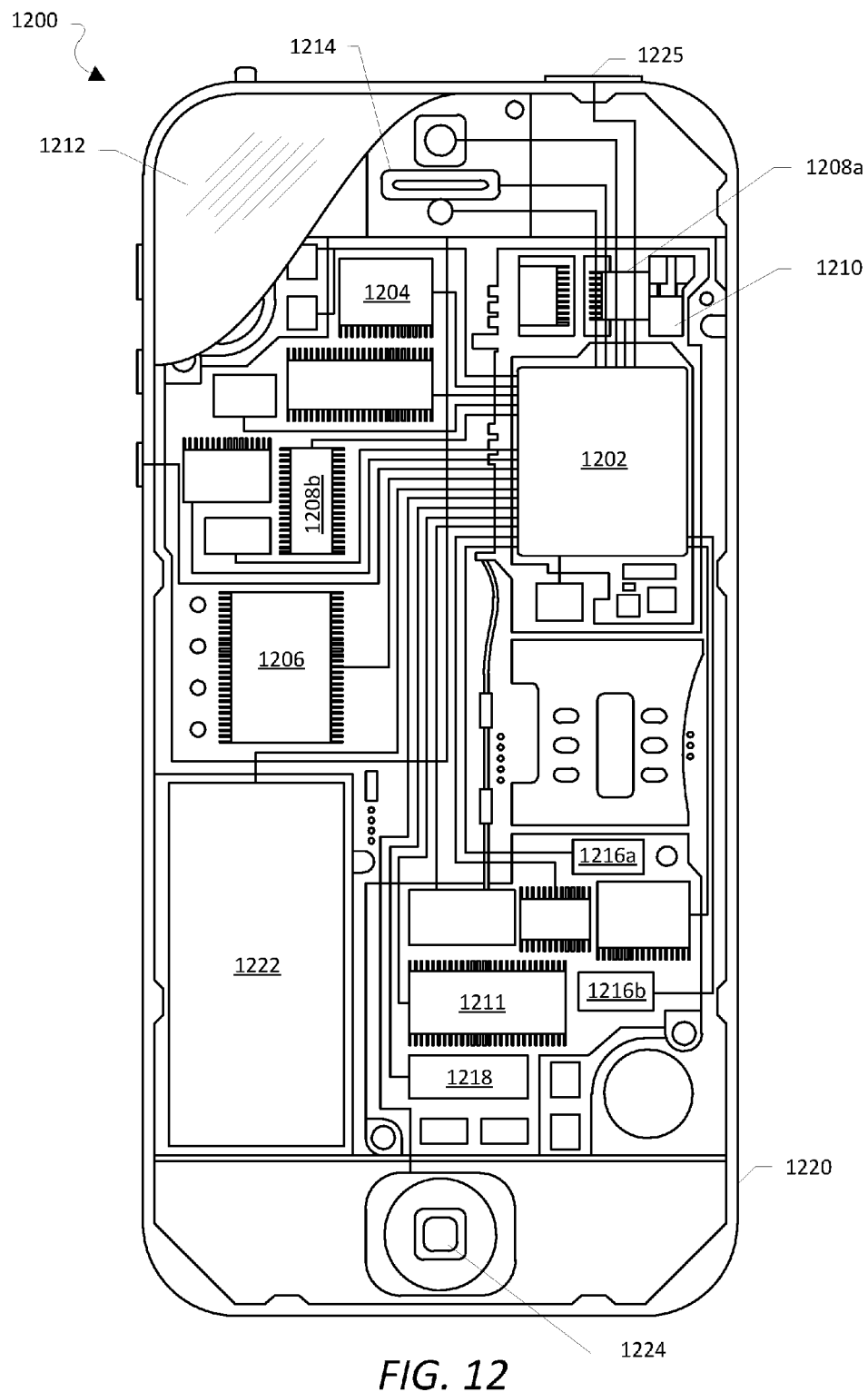
FIG. 12 is a component block diagram of a wireless communication device suitable for use with various examples.

The various examples may be implemented in any of a variety of wireless communication devices 110 and 200, an example of which is illustrated in FIG. 12, as wireless communication device 1200. As such, the wireless communication device 1200 may implement the process and/or the apparatus of FIGS. 1-11, as described herein.

With reference to FIGS. 1-12, the wireless communication device 1200 may include a processor 1202 coupled to a touchscreen controller 1204 and an internal memory 1206. The processor 1202 may be one or more multi-core integrated circuits designated for general or specific processing tasks. The memory 1206 may be volatile or non-volatile memory, and may also be secure and/or encrypted memory, or unsecure and/or unencrypted memory, or any combination thereof. The touchscreen controller 1204 and the processor 1202 may also be coupled to a touchscreen panel 1212, such as a resistive-sensing touchscreen, capacitive-sensing touchscreen, infrared sensing touchscreen, etc. Additionally, the display of the wireless communication device 1200 need not have touch screen capability.

The wireless communication device 1200 may have one or more cellular network transceivers 1208a, 1208b coupled to the processor 1202 and to at least one antenna 1210 and configured for sending and receiving cellular communications. The transceivers 1208a, 1208b and antenna 1210 may be used with the above-mentioned circuitry to implement the various example methods. The cellular network transceivers 1208a, 1208b may be the RF resource 218. The antenna 1210 may be the antenna 220. The wireless communication device 1200 may include two or more SIM cards 1216a, 1216b, corresponding to SIM-1 204a (the first SIM) and SIM-2 204b (the second SIM), coupled to the transceivers 1208a, 1208b and/or the processor 1202. The wireless communication device 1200 may include a cellular network wireless modem chip 1211 (e.g., the baseband modem processor 216) that enables communication via at least one cellular network and is coupled to the processor 1202.

The wireless communication device 1200 may include a peripheral device connection interface 1218 coupled to the processor 1202. The peripheral device connection interface 1218 may be singularly configured to accept one type of connection, or multiply configured to accept various types of physical and communication connections, common or proprietary, such as USB, FireWire, Thunderbolt, or PCIe. The peripheral device connection interface 1218 may also be coupled to a similarly configured peripheral device connection port (not shown).

The wireless communication device 1200 may also include speakers 1214 for providing audio outputs. The wireless communication device 1200 may also include a housing 1220, constructed of a plastic, metal, or a combination of materials, for containing all or some of the components discussed herein. The wireless communication device 1200 may include a power source 1222 coupled to the processor 1202, such as a disposable or rechargeable battery. The rechargeable battery may also be coupled to a peripheral device connection port (not shown) to receive a charging current from a source external to the wireless communication device 1200. The wireless communication device 1200 may also include a physical button 1224 for receiving user inputs. The wireless communication device 1200 may also include a power button 1226 for turning the wireless communication device 1200 on and off.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present examples.

The hardware used to implement the various illustrative logics, logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present examples. Various modifications to these examples will be readily apparent to those skilled in the art, and the generic principles defined herein may be applied to some examples without departing from the spirit or scope of the examples. Thus, the present examples are not intended to be limited to the examples shown herein but is to be accorded the widest scope consistent with the following claims and the principles and novel features disclosed herein.

What is claimed is:

1. A method for a wireless communication device to manage communications via a Radio Frequency (RF) resource, the method comprising:
   determining a collision between activities of a first subscription associated with a first Subscriber Identity Module (SIM) over a first Radio Access Technology (RAT) and activities of a second subscription associated with a second SIM over a second RAT;
   reselecting from the second RAT to a third RAT for the second subscription;
   monitoring neighbor cells associated with the second RAT after reselecting to the third RAT;
   determining whether the activities of the first RAT collide with the activities of the second RAT with respect to a neighbor cell of the neighbor cells;
   reselecting from the third RAT to the second RAT in response to determining that the activities of the first RAT do not collide with the activities of the second RAT with respect to the neighbor cell;
   determining whether the activities of the first subscription have ended;
   initiating a timer in response to determining that the activities of the first subscription have ended;
   determining whether the timer has expired; and
   determining whether the first subscription is inactive in response to determining that the timer has expired, wherein the reselecting from the third RAT to the second RAT further comprises reselecting to the second RAT in response to determining that the first subscription is inactive.

2. The method of claim 1, further comprising:
   communicating on the second subscription over the third RAT in response to determining that the activities of the second RAT have not ended.

3. The method of claim 1, further comprising:
   communicating on the second subscription over the third RAT in response to determining that the first subscription is active.

4. The method of claim 1, further comprising:
   determining that the neighbor cell meets handover or reselection criteria; and
   determining whether the activities of the first RAT collide with the activities of the second RAT with respect to the neighbor cell in response to determining that the neighbor cell meets the handover or the reselection criteria.

5. The method of claim 1, further comprising:
   continuing to camp on the third RAT in response to determining that the activities of the first RAT collide with the activities of the second RAT with respect to the neighbor cell.

6. The method of claim 1, further comprising:
   monitoring neighbor cells associated with the first RAT after reselecting to the third RAT;
   determining whether the activities of the first RAT collide with the activities of the second RAT with respect to the neighbor cell; and reselecting from the third RAT to the second RAT in response to determining that the activities of the first RAT do not collide with the activities of the second RAT with respect to the neighbor cell.

7. The method of claim 1, wherein:
a length of a second repetition period of the activities over the second RAT is multiples of a length of a first repetition period of the activities over the first RAT; and
a length of a third repetition period of the activities over the third RAT is indivisible by the first repetition period.

8. The method of claim 7, wherein:
the first repetition period is one from the group consisting of a Multicast Channel (MCH) Scheduling Period (MSP) and a Discontinuous Reception (DRX) cycle;
the second repetition period is a DRX cycle for the second RAT; and
the third repetition period is a DRX cycle for the third RAT.

9. The method of claim 1, wherein:
the first RAT is one from the group consisting of Long Term Evolution (LTE) and evolved Multimedia Broadcast Multicast Services (eMBMS);
the second RAT is one from the group consisting of Wideband Code Division Multiple Access (WCDMA), Time Division Synchronous Code Division Multiple Access (TD-SCDMA), Code Division Multiple Access 1× Radio Transmission Technology (1×), and LTE; and
the third RAT is Global System for Mobile Communications (GSM).

10. The method of claim 1, wherein:
the activities of the first subscription comprise one from the group consisting of data bursts and pages; and
the activities of the second subscription comprise pages.

11. A wireless communication device, comprising:
a Radio Frequency (RF) resource;
a first Subscriber Identity Module (SIM) associated with a first subscription;
a second SIM associated with a second subscription;
a processor; and
a memory storing instructions that, when executed by the processor, cause the wireless communication device to:
determine a collision between activities of the first subscription over a first Radio Access Technology (RAT) and activities of the second subscription over a second RAT;
reselect from the second RAT to a third RAT for the second subscription;
monitor neighbor cells associated with the second RAT after a reselection to the third RAT;
determine whether the activities of the first RAT collide with activities of the second RAT with respect to a neighbor cell of the neighbor cells;
reselect from the third RAT to the second RAT in response to a determination that the activities of the first RAT do not collide with the activities of the second RAT with respect to the neighbor cell;
determine whether the activities of the first subscription have ended;
initiate a timer in response to a determination that the activities of the first subscription have ended;
determine whether the timer has expired; and
determine whether the first subscription is inactive in response to determining that the timer has expired, wherein the reselection from the third RAT to the second RAT further comprises a reselection of the second RAT in response to determining that the first subscription is inactive.

12. The wireless communication device of claim 11, wherein execution of the instructions causes the wireless communication device to further:
configure the RF resource to communicate on the second subscription over the third RAT in response to a determination that the activities of the second RAT have not ended.

13. The wireless communication device of claim 11, wherein execution of the instructions causes the wireless communication device to further:
configure the RF resource to communicate on the second subscription over the third RAT in response to a determination that the first subscription is active.

14. The wireless communication device of claim 11, wherein execution of the instructions causes the wireless communication device to:
determine that the neighbor cell meets handover or reselection criteria; and
determine whether the activities of the first RAT collide with the activities of the second RAT with respect to the neighbor cell in response to a determination that the neighbor cell meets the handover or the reselection criteria.

15. The wireless communication device of claim 11, wherein execution of the instructions causes the wireless communication device to:
continue to camp on the third RAT in response to a determination that the activities of the first RAT collide with the activities of the second RAT with respect to the neighbor cell.

16. The wireless communication device of claim 11, wherein execution of the instructions causes the wireless communication device to:
monitor neighbor cells associated with the first RAT after a reselection to the third RAT;
determine whether the activities of the first RAT collide with the activities of the second RAT with respect to a neighbor cell of the neighbor cells; and
reselect from the third RAT to the second RAT in response to a determination that the activities of the first RAT with respect to the neighbor cell do not collide with the activities of the second RAT.

17. A non-transitory computer-readable medium comprising instructions that, when executed by a processor of a wireless device, causes the wireless device to perform operations comprising:
determining a collision between activities of a first subscription over a first Radio Access Technology (RAT) and activities of a second subscription over a second RAT;
reselecting from the second RAT to a third RAT for the second subscription;
monitoring neighbor cells associated with the second RAT after reselecting to the third RAT;
determining whether the activities of the first RAT collide with activities of the second RAT with respect to a neighbor cell of the neighbor cells;
reselecting from the third RAT to the second RAT in response to determining that the activities of the first RAT do not collide with the activities of the second RAT with respect to the neighbor cell;
determining whether the activities of the first subscription have ended;

initiating a timer in response to determining that the activities of the first subscription have ended;

determining whether the timer has expired; and determining whether the first subscription is inactive in response to determining that the timer has expired, wherein the reselecting from the third RAT to the second RAT further comprises reselecting to the second RAT in response to determining that the first subscription is inactive.

18. A wireless communication device, comprising:

means for determining a collision between activities of a first subscription over a first Radio Access Technology (RAT) and activities of a second subscription over a second RAT;

means for reselecting from the second RAT to a third RAT for the second subscription;

means for monitoring neighbor cells associated with the second RAT after reselecting to the third RAT;

means for determining whether the activities of the first RAT collide with activities of the second RAT with respect to a neighbor cell of the neighbor cells;

means for reselecting from the third RAT to the second RAT in response to determining that the activities of the first RAT do not collide with the activities of the second RAT with respect to the neighbor cell;

means for determining whether the activities of the first subscription have ended;

means for initiating a timer in response to determining that the activities of the first subscription have ended;

means for determining whether the timer has expired; and means for determining whether the first subscription is inactive in response to determining that the timer has expired, wherein the means for reselecting from the third RAT to the second RAT further comprises reselecting to the second RAT in response to determining that the first subscription is inactive.

* * * * *